Figure 1:
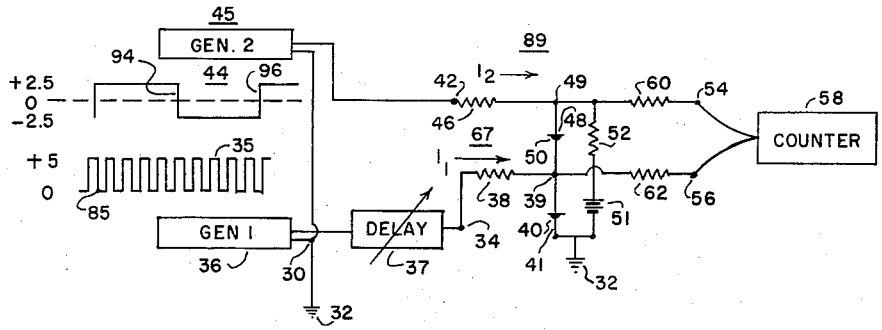

Nov. 16, 1965 — JAMES E. WEBB — 3,218,479
ADMINISTRATOR OF THE NATIONAL AERONAUTICS
AND SPACE ADMINISTRATION
PHASE DETECTOR ASSEMBLY

Filed Feb. 28, 1963 — 6 Sheets-Sheet 1

GORDON D. ANDERSON,
INVENTOR.

BY

ATTORNEYS

Nov. 16, 1965

JAMES E. WEBB
ADMINISTRATOR OF THE NATIONAL AERONAUTICS
AND SPACE ADMINISTRATION
PHASE DETECTOR ASSEMBLY 3,218,479

Filed Feb. 28, 1963

6 Sheets-Sheet 2

GORDON D. ANDERSON,
*INVENTOR.*

BY

*ATTORNEYS*

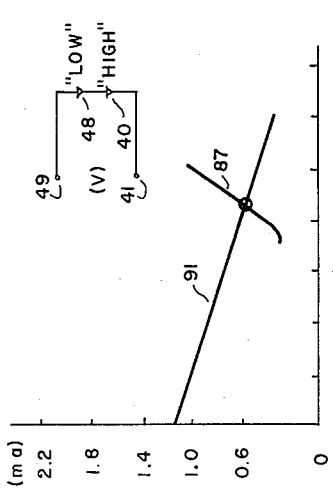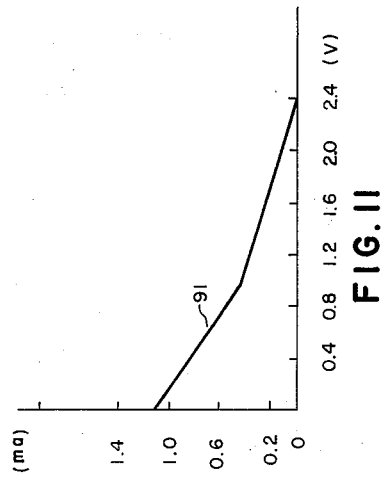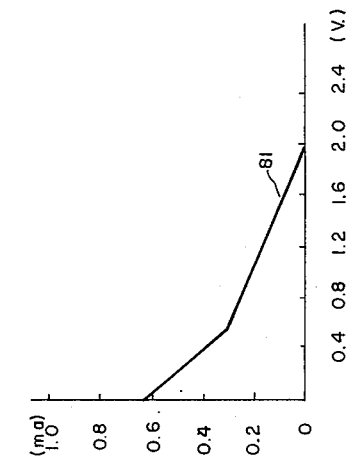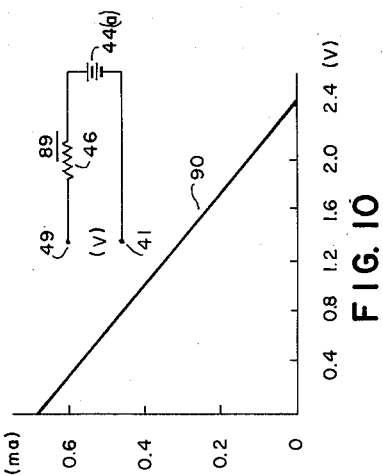

GORDON D. ANDERSON,
*INVENTOR.*

ATTORNEYS

Nov. 16, 1965

JAMES E. WEBB  3,218,479
ADMINISTRATOR OF THE NATIONAL AERONAUTICS
AND SPACE ADMINISTRATION
PHASE DETECTOR ASSEMBLY

Filed Feb. 28, 1963

6 Sheets-Sheet 5

GORDON D. ANDERSON,
*INVENTOR.*

BY

ATTORNEYS

Nov. 16, 1965  JAMES E. WEBB  3,218,479
ADMINISTRATOR OF THE NATIONAL AERONAUTICS
AND SPACE ADMINISTRATION
PHASE DETECTOR ASSEMBLY
Filed Feb. 28, 1963  6 Sheets-Sheet 6

GORDON D. ANDERSON,
*INVENTOR.*

BY

ATTORNEYS

3,218,479
PHASE DETECTOR ASSEMBLY

James E. Webb, Administrator of the National Aeronautics and Space Administration, with respect to an invention of Gordon D. Anderson
Filed Feb. 28, 1963, Ser. No. 261,917
4 Claims. (Cl. 307—88.5)

This invention relates to the art of electrical signal processing and particularly to means for discriminating with respect to a first signal in terms of the presence or absence of a second signal at the time of occurrence of the first signal.

It has been found necessary in certain applications of very high frequency generators, frequency multipliers and dividers to determine their short time, cycle to cycle, stability or accuracy, it having been found that information as to the long-time or statistical accuracy of these devices, which may be excellent, is an inadequate guide as to their short term accuracy. It will be appreciated that short term accuracy becomes more important as information is electrically processed at higher and higher rates.

It has further been found that short term signal disturbances due, for example to electrical noise, are manifested by wave form distortions and that the extent of distortion can be related as a phase measurement by comparison with a signal from a frequency standard operating at the same frequency, at a multiple frequency or submultiple frequency.

Phase measurement or comparison is, in accordance with this invention, accomplished by means which combine the functions of anticoincidence detection with signal sampling in a manner which compares the time of occurrence of the leading edges of the two wave forms compared. If the wave form of interest coincides with or lags the reference wave it will be inhibited and no output will be produced. If the wave form of interest leads the reference wave form an output will be produced. By means of a conventional counter it is possible to distinguish these conditions on a cycle for cycle basis.

While it was first concluded that the above functions could have been achieved by a combination of several devices such as "and" circuitry for gating and coincidence detection with multivibrator flip-flops providing signal sampling and lock-out, it was conceived and determined that these functions could be performed by a much simpler combination of circuit elements.

In accordance with these findings, the invention, an electrical discriminator or phase detector assembly, employs two nonlinear circuits each of which includes a resistive element and a two terminal nonlinear circuit means, such as a tunnel diode, which provides a first and second positive resistance operating regions separated by a negative resistance region, the nonlinear circuits being common to the extent of one of the nonlinear means which has a higher current peak (a factor of approximately 2 produces excellent operation) to its first positive resistance region than the other nonlinear means. Biasing means, such as a direct current source and a resistance element in series, are connected across the nonlinear means in a polarity to bias both nonlinear means to a point of operation in their first (lower voltage) positive resistance regions. Sensing means such as an electrical pulse counter to read-out the output of the discriminator is connected across the uncommon nonlinear means through such resistance as to prevent significant loading effects upon the discriminator.

The objectives, features and advantages of the present invention will become more apparent from the following discription when considered together with the accompanying drawings in which:

FIGURE 1 is a schematic circuit diagram of an embodiment of the invention; and
FIGURES 2–20 are graphical representations of characteristics of operation of the embodiment shown in FIGURE 1.

Referring now to the drawings and initially to FIGURE 1, input terminal 30 connected to a common point or ground 32 and input terminal 34 provides a first circuit input across which is applied a first signal 35 from first generator 36 through adjustable delay line 37 which is a pulse train (e.g. 10 mc.) having a positive pulse amplitude of 5 volts (at terminal 34 with respect to terminal 30) producing current pulses $I_1$. The first circuit input is connected through input resistor 38 (e.g. 2700 ohms) across tunnel diode 40 (e.g. 1N2969), resistor 38 being connected between terminal 34 and the cathode terminal 39 of tunnel diode 40. The anode terminal 41 of tunnel diode 40 is connected to circuit ground. Current pulses $I_1$ thus flow through a first circuit or circuit leg from terminal 34 to ground 32.

A second circuit input is provided by input terminals 42 and 30 across which is applied a second signal 44 from second generator 45 to be compared with the first signal 35. The second signal is an alternating current pulse wave (e.g. 1 mc.) having an amplitude of 2.5 volts and a peak-to-peak voltage of 5 volts (the same as generator 36). This second circuit is connected through resistor 46 across tunnel diodes 48 (e.g. 1N2939) and 40 in series. Resistor 46 connects between terminal 42 and the cathode terminal 49 of tunnel diode 48, and the anode terminal 50 of tunnel diode 48 connects to the cathode terminal 39 of tunnel diode 40. Diode 40 is chosen to have a higher peak current characteristic (e.g. approximately double) than diode 48. Current pulses $I_2$ flow from terminal 42 to terminal 30 when the polarity of the input is positive at terminal 42 with respect to terminal 30. Of the diodes cited as examples, diode 40 has a tunnel region peak current of approximately 2.2 milliamperes (ma.) and diode 48 of approximately 1 milliampere.

A biasing circuit consisting of a direct current source (e.g. 1 volt) 51 in series with resistor 52 (e.g. 2000 ohms) is connected across tunnel diodes 40 and 48 which raises the current operating point of diode 48 to a point on its first positive resistance, which is about half the value of its peak point current (a point dividing the first positive resistance region from the negative resistance region). Thus, resistor 46 is on the order of half again the value of resistor 38 and resistor 46 is on the order of double the value of resistor 52.

The output of the discriminator is obtained across diode 48 and appears at output terminals 54 and 56 from which it is applied to a pulse counter 58 such as would include standard means for amplifying (e.g. a broad band differential amplifier would be employed to drive standard commercial counters), counting and printing out a pulse count. In addition to the counter the discriminator assembly as a whole includes resistors 60 and 62 (e.g. 10,000 ohms each) which are connected one in series with each output terminal to help isolate output circuitry, such as counter 58, from the discriminator and prevent loading effects, as from lower impedance output circuitry, from effecting discriminator operation. Resistor 60 connects between terminal 54 and the cathode of diode 48 and resistor 62 connects between terminal 56 and the anode of diode 48.

Figure 2:
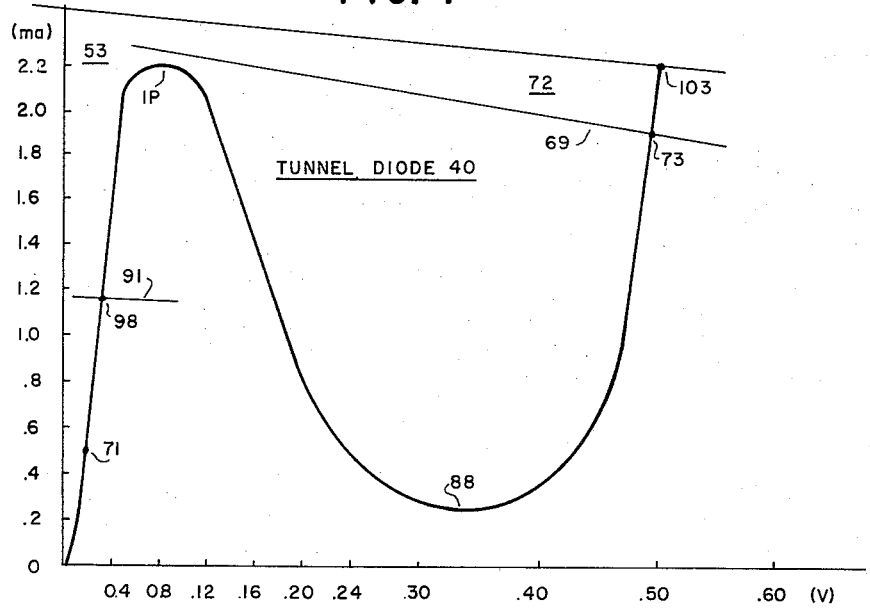
Figure 3:
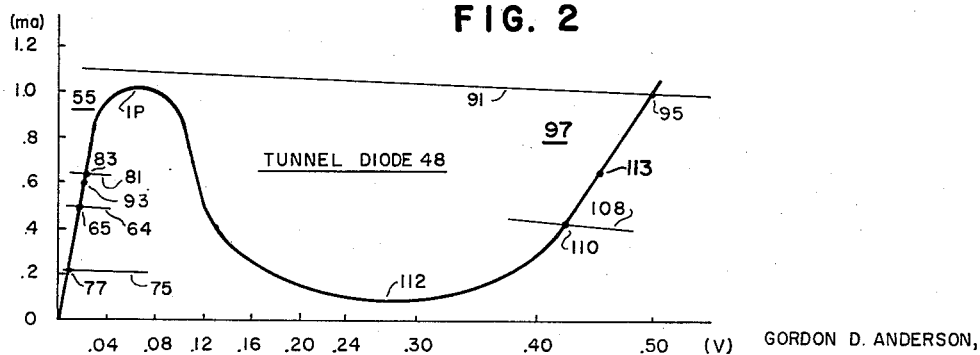

To examine the operation of the circuitry, assume first that neither of the input signals are present. The discriminator output, which appears across tunnel diode 48, is then governed by the current through the series circuit consisting of source 51, resistor 52 and diodes 48 and 40. Since the current cannot exceed .5 milliampere (ma.)

through this circuit due to the 2000 ohms resistance of resistor 52 alone, it appears from FIGURES 2 and 3 showing the approximate current-voltage characteristics of diodes 40 and 48, respectively, that the voltage drops and thus the resistance will be quite small with respect to the resistance of resistor 52. This indicates that the current through diode 48 will be just slightly below .5 ma. and this point is plotted from the bias load line 64 of FIGURE 4, as point 65 on FIGURE 3 resulting in an initial or resting, output voltage across diode 48 of approximately .02 volt, for a no signal condition. Thus diodes 40 and 48 both remain in their low voltage regions 53 and 55, respectively.

Figure 5:
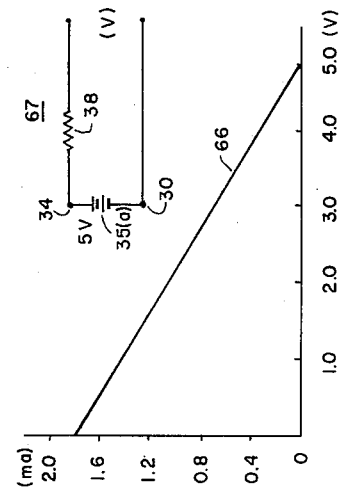
Figure 6:
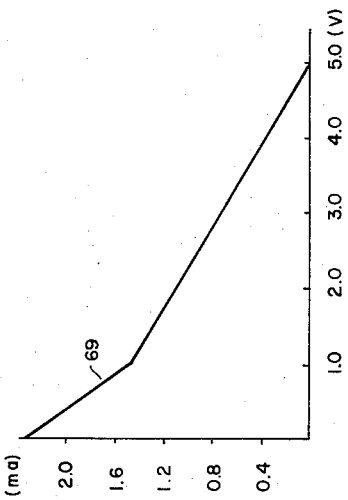
Figure 12:
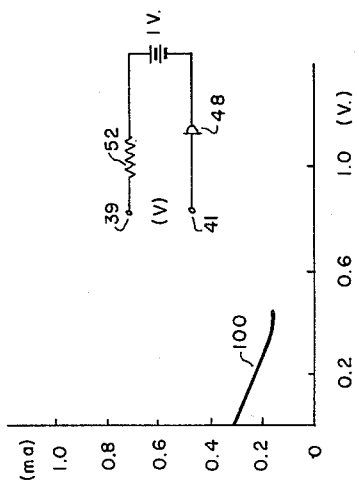
Figure 13:
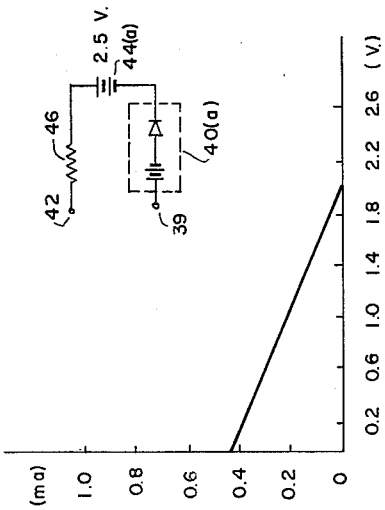
Figure 14:
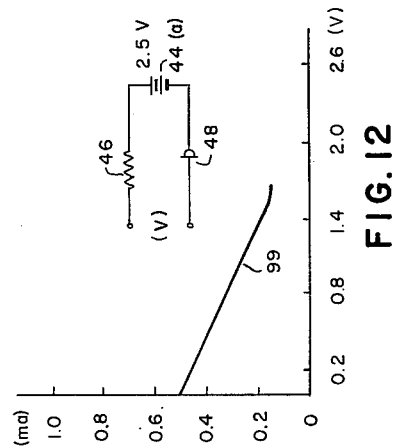

Next, assume that the first signal or pulse train 35 is applied across the first input between terminals 34 and 30 and is undelayed by adjustable delay line 37. This in turn has the effect of increasing the current through diode 40 as this applied signal is connected through resistor 38 across diode 40. To determine the current now through diode 48 load line 64, and load line 66 representative of first input circuit 67 (source labeled 35(a) represents D.C. equivalent for signal 35), shown in FIGURE 5, are combined as load line 69 in FIGURE 6. Plotting load line 69 on FIGURE 2, it is seen that the current through diode 40 would be approximately 2.3 ma. and exceeds the peak current $I_p$ for diode 40. The result is that diode 40 flips from its low voltage state 72 is point 73. From point 73, the intersection of load line 69 and the characteristic curve of diode 40, it will be seen that the current through diode 40 is now approximately 1.9 ma. with a voltage drop of approximately .49 volt.

Figure 4:
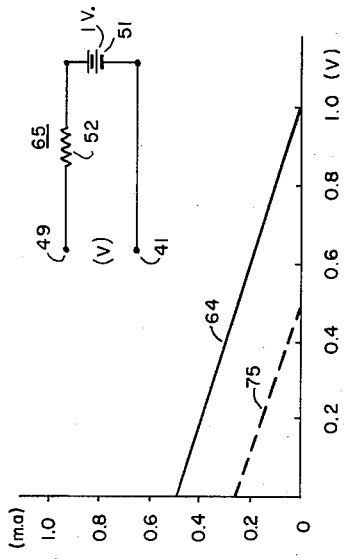

With this increased voltage drop in the series circuit through diode 48 it is significant to examine the effect on the output voltage. Turning to FIGURE 4, a modified load line 75 (shown in broken line) is drawn from a source voltage of approximately .5 volt (instead of 1 volt), representing the net voltage applied to the bias circuit with the subtraction of the voltage now across diode 40 from the voltage of source 51. Plotting load line 75 on FIGURE 3, it appears from intersecting point 77 that there has occurred a decrease in output voltage, across diode 48, of from approximately .02 volt to .01 volt, a very slight change, however, compared to changes which, as will be shown, occur when inputs occur in the proper order for response ($I_2$ leading $I_1$). Accordingly, it may be concluded that a signal across terminals 34 and 30 alone does not produce a significant output.

Next, the case is considered where signal 44 is applied to the second input in the presence of signal 35 applied to the first input. Signal 44 should be the lower frequency if the input signals are of different frequency (if different, signal 35 should be integral multiple of signal 44) and here we will assume that signal 35 is at 10 megacycle rate and signal 44 is a 1 megacycle rate. With the occurrence of a positive half cycle of signal 44, current through diode 48 increases and in accordance with FIGURE 3 the voltage increases.

Figure 7:
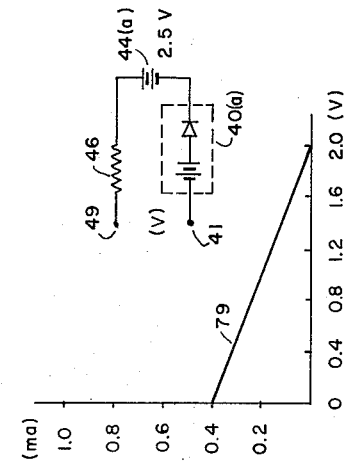

Current flowing in diode 48 is the result of the bias plotted as load line 75 in FIGURE 4 and the signal voltage (2.5 volt source 44(a) representative of signal 44, and source 40(a) representative of voltage across diode 40) plotted as load line 79 in FIGURE 7. The sources are represented schematically as batteries for this instantaneous case. The composite load line 81 of load lines 75 and 79, shown in FIGURE 8, is replotted in FIGURE 3. As will be noted, the resulting current in diode 48 is shown at point 83 as approximately .61 ma. at a drop of approximately .025 volt, demonstrating that diode 48 is not raised to its high voltage state by the presence of both signals, signal 35 having occurred first. In fact, the voltage across diode 48 does not change significantly.

At the end of the first cycle of first signal 35 (point 85), current from this source will drop to zero but diode 48 must remain in the low voltage state (no output) even in the presence of signal 44 if the intended logic is to be preserved. If diode 40 is maintained in its high voltage state by current from second signal 44, the voltage drop across diode 40 will reduce current flow through both diodes such that current through diode 48 will be insufficient to raise diode 48 to its high voltage state as already shown. In this manner, output which would be provoked by the presence of second signal 44 alone or occurring first is prevented.

The combined voltage drop, across both diodes, is plotted in FIGURE 9 as curve 87, diode 40 being in a high state or forward region 72 (FIGURE 2) and diode 48 being in a low voltage state 55. Curve 87 is plotted between current limits of the valley point 88 of diode 40 and the peak point $I_p$ of diode 48. Load lines for resistor 52 (load line 64) in bias circuit 65, and for resistor 46 in input circuit 89 (resistor 46 and source 44a) are plotted in FIGURES 4 and 10 (load line 90), respectively, and their combined current is plotted as curve 91 in FIGURE 11. A re-plot of FIGURE 11 on FIGURE 9 shows that the total current is approximately 0.56 ma. through the diodes which is sufficient (above the valley point) to hold diode 40 in its high voltage state but insufficient to trip diode 48 and produce a significant output. The voltage drop will cause a small negative going change in the output as the current in diode 48 decreases from about .61 ma. to about .56 ma. (point 93 of FIGURE 3) of about .003 volt.

It has now been demonstrated that if a signal occurs in the first input circuit 67, no output will be produced; that if both signals are present, with signal 35 occuring first, no output will be produced, and finally, if signal 35 goes off in the presence of signal 44, as would be the case if signal 35 were higher in frequency, no output will be produced.

At the end of the cycle just described, input signal 44 will go negative at point 94 (FIGURE 1) for ½ cycle at the frequency of signal 44 returning diode 40 to its original low voltage state for the duration of this negative pulse extending in time to point 96. At the next up-crossing of the axis of input signal 44, diode 40 will again be switched to its high voltage state by signal 35, provided first signal 35 is present, and the events discussed above will repeat. If a first signal pulse of signal 35 is not present at the up-crossing of signal 44 (a positive pulse of signal 44 occurs before a pulse of signal 35) diode 40 will not be tripped until a pulse of signal 35 occurs and the state of diode 40 will then have no significance. This is demonstrated in the following discussion.

If positive signal 44 occurs in the absence of and thus leads signal 35, diode 48 will be raised to its high voltage state 97. The total current through the diodes resulting from the bias and signal 44 is plotted in FIGURE 11. Re-plots of curve 91 of FIGURE 11 on the tunnel region of diodes 40 and 48 given in FIGURES 2 and 3, respectively, show that diode 48 will be raised to its high voltage state but diode 40 (at point 98) will not. The high voltage state voltage across diode 48 appears at curve intersection 95 (FIGURE 3) to be about .48 volt. This voltage will appear on the output as a significant signal pulse having a rise of from about .01 volt (point 77) to .48 volt which will be amplified and counted by counter 58.

Figure 15:
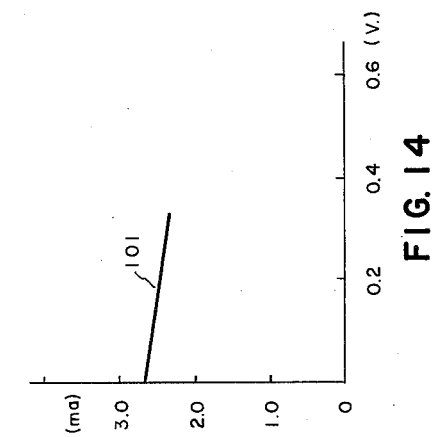
Figure 17:
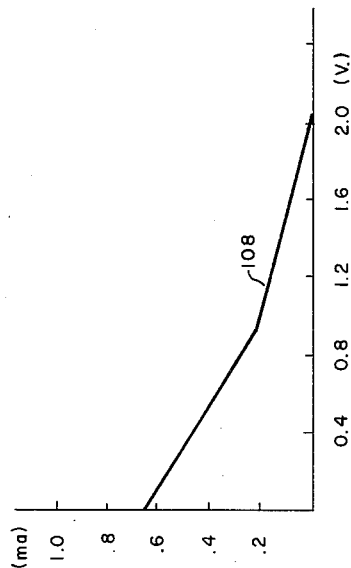
Figure 16:
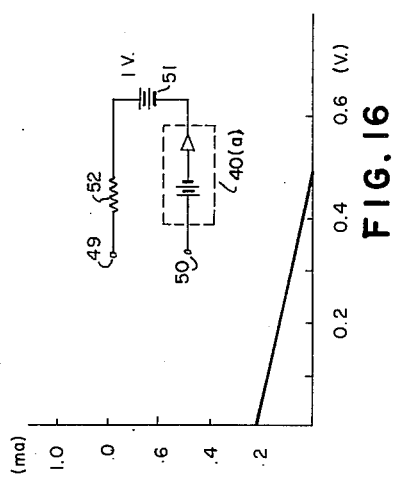
Figure 18:
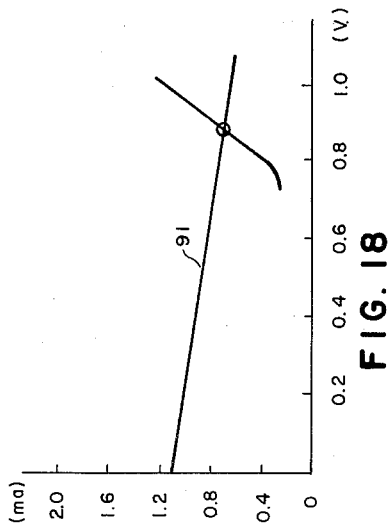

If pulse signal 35 appears in the presence of pulse signal 44 there will be three sources of current on diode 40 and it will be raised to its high voltage state. It is now necessary to show that diode 48 remains in the high voltage state maintaining the signal output. The voltage across diode 40 as a result of signal 44 is shown as curve 99 in FIGURE 12, as a result of the bias supply it is shown as curve 100 in FIGURE 13 and as a result of signal 35 it is shown as curve 66 in FIGURE 5. The total current through diode 40 is plotted as curve 101 in FIGURE 14 and replotted on the forward conduction portion of the curve for diode 40 in FIGURE 2 to show an intercept point 103 at approximately 0.5 volt. Once in the high voltage state, the voltage drop across diode 40 will be a minimum of 0.49 volt due to the current flow from signal 44. Therefore, we can treat diode 40 as a fixed supply 40(a) of 0.49 volt (plus additional drop on the linear portion of the forward conduction region of diode 40 due to current from the second input signal 44) in series with diode 48 as shown in curves 105 (FIGURE 15) and 106 (FIGURE 16). FIGURES 15 and 16 give the new current through diode 48 due to the current from the second signal 44 and bias supply, respectively. The total current through diode 48 is then plotted in FIGURE 17 as curve 108 and replotted on the conduction curve for diode 48 in FIGURE 3. As shown in FIGURE 3 at point 110, the output voltage has decreased to 0.42 volt but since the current through diode 48 is greater than the valley point current, (at point 112) diode 48 will remain in a high-voltage state. The circuit output has dropped by 0.060 volt. This is small and, it is relatively simple to adjust the sensitivity of output responsive devices such as counter 58, to which the output of diode 48 is fed, to be unresponsive to this change in view of the amplitude of maximum output which is about eight times this value.

When signal 35 disappears in the presence of signal 44 both diodes will remain in their high voltage states due to the current from signal 44 and the bias source, however, the voltage drop 48(a) across diode 48 will rise slightly. The current through diodes 40 and 48 is plotted as curve 91 in FIGURE 11 and replotted in FIGURE 18, which is a plot of the combined voltage drops of diodes 40 and 48 in their high voltage state. The intercept is at 0.66 ma., and this may be taken as the current flowing through both diodes. Referring to FIGURE 3, it will be seen that the voltage drop corresponding to this current, at point 113, is approximately 0.45 volt; a rise of 0.025 volt.

The output to counter 58 will thus fluctuate between 0.42 and 0.45 volt (approximately) with the signal 35 for the duration of the positive portion of input signal 44.

At the conclusion of the positive portion of signal 44, diode 48 will return to its low voltage state removing the output signal. Diode 40 will return to its low voltage state at the next down-crossing of signal 35 and both diodes will remain in their low voltage states for the duration of the negative half-cycle of signal 44.

Figure 19:
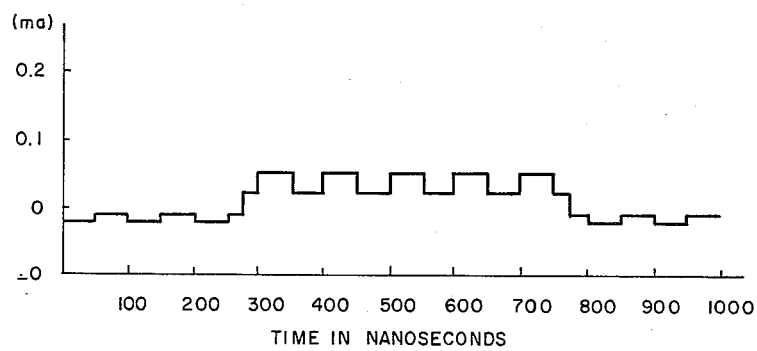
Figure 20:
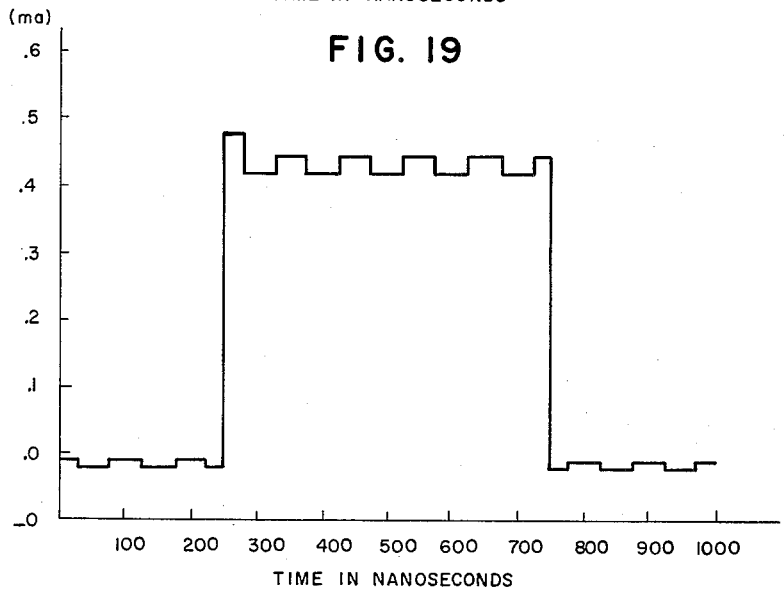

The output signals are summarized in FIGURE 19 for the case where a positive pulse ($I_2$) of signal 44 lags a positive pulse ($I_1$) of signal 35, and in FIGURE 20 for the case where a pulse of signal 35 lags a positive pulse of signal 44. A 25 nanosecond ($10^{-9}$ seconds) lead or lag between signals has been assumed for this illustration and the frequencies are assumed to be 10 mc. for signal 35 and 1 mc. for signal 44. For clarity, rise and switching times have not been plotted, but these are on the order of 1 or 2 nanoseconds for the diodes set forth as examples above.

The significance of the effect of the time positions of $I_1$ and $I_2$ is manifest. In FIGURE 19, $I_2$ lags $I_1$ and a significant output responsive to $I_2$ is inhibited, whereas in FIGURE 20 with $I_2$ leading $I_1$, there is a circuit output responsive to $I_2$ which is quite significant and detectable by counter 58. By intentionally introducing a known time delay, by delay line 37, the occurrence of the output of generator 36 may be adjusted with respect to generator output 44 and pulses counted by the circuit in instances where $I_2$ actually lags the positive pulse output of generator 36 and thus lead or lag conditions observed. If a fixed phase delay of a known amount is introduced, we are in effect, measuring the number of times during any convenient interval of time that the shift in phase of the signal from source 2 exceeded that delay. Thus if a number of delay settings are used in succession and a count obtained for each, we will obtain a statistical distribution for the short term phase behavior of the signal.

Alternately we may use the device for precise measurement of extremely small phase differences by means of a calibrated delay line and a rapid series of go/no-go tests.

It is to be observed that while the present invention affords an excellent means of phase comparison of like frequencies, if automatic recording of changing response (phase stability) is required, the effective frequency limit of counter 58 is greatly extended by two-frequency signal sampling of the character described. Accordingly, the implicit feature of signal gating is made adjustable to make more versatile the employment of the invention.

There appears to be a number of other applications for the invention in the general field of event detection and phase measurement. For example, delay-lock-loops are currently being proposed for long range radar systems. Such a loop provides an extremely narrow band signal-tracking filter in a manner similar to the conventional phase-lock-loop except that output signals remain phase coherent. Unfortunately, the electronic phase shifters necessary for this technique have neither the precision nor frequency capability necessary for modern radar applications. However, banks of fixed phase shift elements and high speed switching might be used in lieu of phase shifters if a suitable detector and switching elements were available. In other words, the requirement would be digitized and phase shift would be controlled by a series of go/no-go tests. This invention performs exactly this function. In this use a number of the circuits would be required and the input signal would be passed through parallel paths consisting of arbitrary phase shifts. The proper delay would then be selected and routed to the delay lock loop.

Another example of use is in analog to digital conversion of phase information. The most prevalent technique is the gating of a simple pulse train. Precise control of gate width is difficult and the method is subject to error due to circuit limitations such as gate slope. An ensemble of phase detectors as herein disclosed would be used to give a more precise digital readout on a cycle by cycle basis. For this application the reference phase shift of each detector would be adjusted so that signals occur progressively later for each detector. The test inputs and the output terminals would then be tied together by suitable isolation circuits. If the output of each detector was first differentiated the number of pulses would be a direct indication of the amount of phase shift necessary to "balance" the test signal.

Still another example of use was discovered during operation of the invention when it was noted that very small differences in line lengths on the two inputs could be readily resolved by supplying both inputs from a single source through the test lines. This simple test setup is analogous to interferometer measurements.

Obviously, many other modifications and variations of the present invention are possible in the light of the above teachings. It is, therefore, to be understood that within the scope of the appended claims the invention may be practiced other than as specifically described.

What is claimed is:

1. A phase detector for comparing the phase relationship between a first input signal and a second input signal, said first input signal being a series of regularly recurring positive polarity pulses and said second input signal being a series of alternating pulses, the frequency of said first input signal being an integral multiple of the frequency of said second input signal, said phase detector comprising: a first tunnel diode connected between a first input terminal and ground; a second tunnel diode connected between a second input terminal and said first input terminal, said second tunnel diode having a peak current characteristic of approximately one half the peak current characteristic of said first tunnel diode; biasing means connected across said first and second tunnel diodes for biasing said tunnel diodes in their first positive resistance regions; first means for applying said first input signal to said first input terminal; second means for applying said second input signal to said second input terminal, whereby said second tunnel diode is switched to its high voltage region only when said second input signal leads said first input signal in phase; and output means connected across said second tunnel diode for sensing voltage rises thereacross, thereby to provide an output indicating that said second input signal leads said first input signal in phase.

2. A phase detector as described in claim 1 wherein the integral multiple of the frequency of said first input signal with respect to the frequency of said second input signal is one.

3. A phase detector as described in claim 1 wherein said first means for applying said first input signal includes an adjustable phase delay whereby the phase relationship between said first input signal and said second input signal may be varied by adjustment of said adjustable phase delay.

4. Apparatus for detecting the phase relationship between a first input signal and a second input signal, said first input signal being a series of regularly recurring positive polarity reference pulses and said second input signal being a series of alternating pulses, the frequency of said first input signal being an integral multiple of the frequency of said second input signal, comprising in combination: a first nonlinear circuit including a first tunnel diode connected between a first input terminal and ground; a second nonlinear circuit including a second tunnel diode connected between a second input terminal and said first input terminal, said second tunnel diode having a peak current peak characteristic of approximately one half the current peak characteristic of said first tunnel diode; biasing means connected across said first and second tunnel diodes for biasing said tunnel diodes in their first positive resistance regions; means for applying said positive polarity reference pulses to said first input terminal, and means for applying said alternating pulses to said second input terminal, whereby said second tunnel diode is switched to its high voltage region only for the duration of the positive portion of each alternating pulse which leads in phase the positive polarity reference pulses; and counter means connected across said second tunnel diode for sensing voltage rises across said second tunnel diode whenever said second tunnel diode is switched to its high voltage region, whereby an output at said counter means indicates that said alternating pulses lead said positive polarity reference pulses in phase.

References Cited by the Examiner
UNITED STATES PATENTS
3,143,662  8/1964  Hill et al. _____ 307—88.5

ARTHUR GAUSS, *Primary Examiner.*

JOHN W. HUCKERT, *Examiner.*